United States Patent
Van Dam

(10) Patent No.: US 6,574,943 B2
(45) Date of Patent: Jun. 10, 2003

(54) CONVEYOR ASSEMBLY FOR PACKAGINGS, AND METHOD FOR DELIVERY OF A PACK

(75) Inventor: Aaldert Christiaan Van Dam, Reno, NV (US)

(73) Assignee: Blue Print Holding B.V., Woerden (NL)

( * ) Notice: Subject to any disclaimer, the term of this patent is extended or adjusted under 35 U.S.C. 154(b) by 0 days.

(21) Appl. No.: 09/931,247

(22) Filed: Aug. 17, 2001

(65) Prior Publication Data

US 2003/0033788 A1 Feb. 20, 2003

(51) Int. Cl.[7] .................................................. B65B 35/50
(52) U.S. Cl. ............................ 53/447; 53/540; 53/473; 53/566; 53/247; 414/793.4; 414/794.4; 414/790.3
(58) Field of Search ..................... 414/793.4, 794.4, 414/790.3; 53/447, 540, 473, 566, 247

(56) References Cited

U.S. PATENT DOCUMENTS

| | | | | |
|---|---|---|---|---|
| 3,603,462 A | * | 9/1971 | Moser | 214/8.5 A |
| 3,744,649 A | * | 7/1973 | Ward, Jr. | 214/6 BA |
| 3,904,043 A | * | 9/1975 | Jones | 216/6 A |
| 4,290,723 A | | 9/1981 | Johansson | |
| 4,520,614 A | * | 6/1985 | Aykut et al. | 53/540 |
| 4,720,229 A | * | 1/1988 | Steinhart | 414/46 |
| 4,802,808 A | * | 2/1989 | Wolk et al. | 414/789.2 |
| 4,927,321 A | | 5/1990 | Lucas | |
| 4,939,891 A | * | 7/1990 | Podini | 53/496 |
| 5,431,530 A | * | 7/1995 | Kobayashi et al. | 414/794.4 |
| 5,439,344 A | * | 8/1995 | Yoshizuka et al. | 414/789.1 |
| 5,499,489 A | * | 3/1996 | Perobelli et al. | 53/540 |
| 5,605,433 A | * | 2/1997 | Tanaka | 414/793.4 |
| 5,642,603 A | * | 7/1997 | Tanaka | 53/445 |
| 5,779,432 A | * | 7/1998 | Pena | 414/794.4 |
| 6,061,996 A | * | 5/2000 | Vissers et al. | 53/244 |
| 6,241,458 B1 | * | 6/2001 | Berndl | 414/790.3 |

FOREIGN PATENT DOCUMENTS

FR        2605592        4/1988

\* cited by examiner

Primary Examiner—Christopher P. Ellis
Assistant Examiner—Rashmi Sharma
(74) Attorney, Agent, or Firm—Young & Thompson

(57) ABSTRACT

Conveyor assembly for packagings, comprising a substantially horizontally conveying conveyor. Situated near the delivery end of the conveyor is a bearing plate, which when the pack moves onto it moves further substantially at the same speed as the conveyor into an accommodation in which the pack has to be placed. When the pack is entirely clear of the conveyor, the bearing plate is moved back so fast that the pack, through its inertia and through its speed of displacement, does not move back and comes to a standstill, so that it is subsequently received in the accommodation.

8 Claims, 4 Drawing Sheets

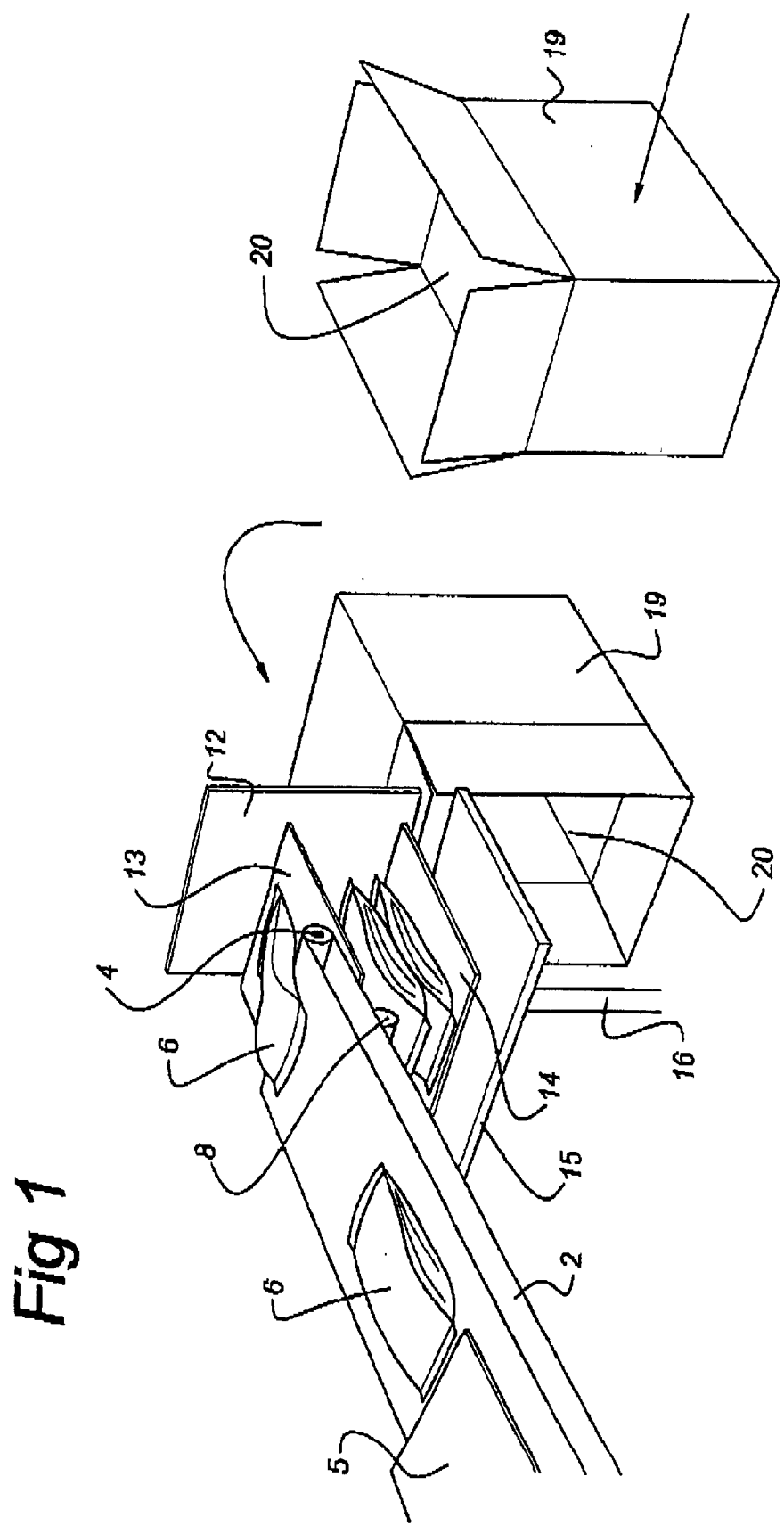

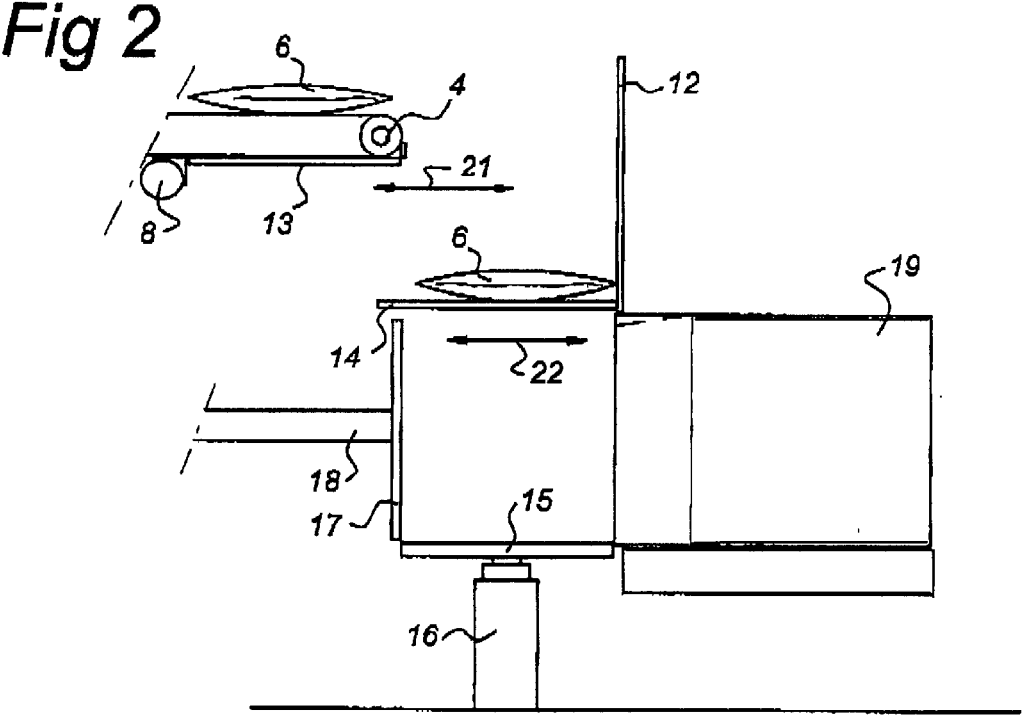
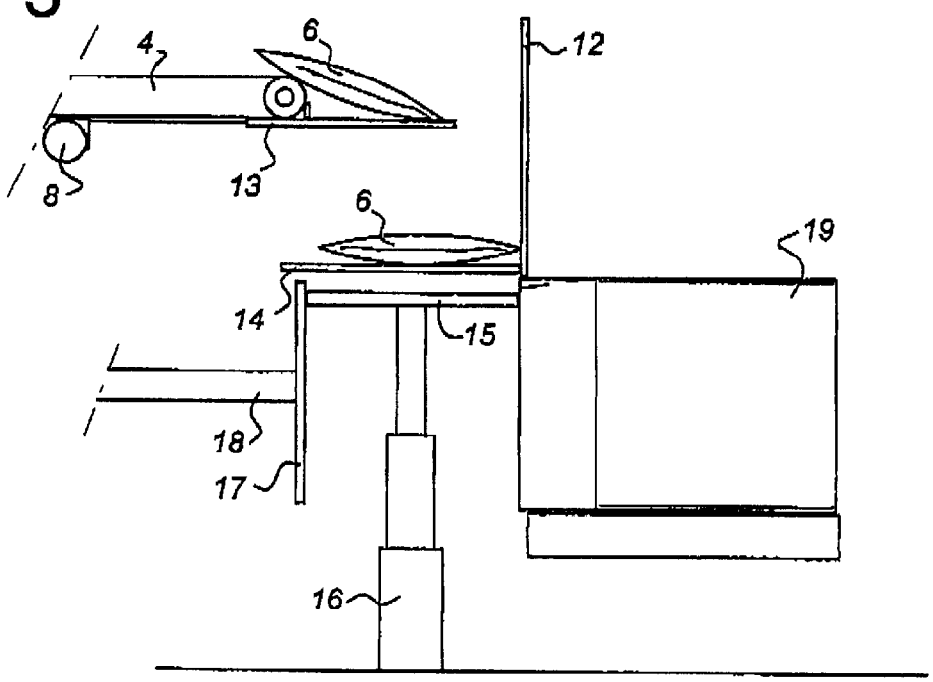

CONVEYOR ASSEMBLY FOR PACKAGINGS, AND METHOD FOR DELIVERY OF A PACK

TECHNICAL FIELD OF THE INVENTION

The invention relates to a conveyor assembly for packagings, in particular for heavier packagings which are fed in one by one and have to be packed in a box. The invention also relates to a method for packing those articles in a box.

BACKGROUND OF THE INVENTION

Products such as bags of chips are packed by first placing the chips in bags, which are subsequently fed to a device for stacking them. When a suitable stack has been formed, said stack is pushed in some way into an outer such as a box.

Many ways of collecting such packagings, such as bags of chips, into a stack are known in the prior art. Such bags are generally fed in on a substantially horizontal conveyor belt and are subsequently stacked on top of one another in the vertical direction. During this stacking on top of one another it is important for the bags to be moved quickly, on the one hand, but not to fall from quite a great height, on the other hand.

It has in fact been found that product can be damaged if such bags fall from quite a great height. This applies to, for example, packagings of frozen chips, where the chips break during the fall.

It is an object of the present invention to move in particular larger packagings, without damaging them, from a horizontal position, in which they are lying one behind the other, to a vertical position, in which they are lying one above the other.

It is a further object of the present invention to process packagings rapidly and subsequently place them in an outer.

It is yet a further object of the present invention to accomodate packagings as far as possible without damage as they leave the end of a delivery conveyor.

More particularly, the object of the present invention is to ensure that, as a result of the high delivery speed of a conveyor, such packagings do not run against stops and the like, which can cause damage, and/or that they do not drop from a considerable height.

SUMMARY OF THE INVENTION

One or more of the abovementioned objects is achieved by a conveyor assembly for packagings, comprising a substantially horizontally conveying conveyor and an accommodation or receiving space for packagings, which receptacle is situated near the delivery end of said conveyor, in line with the latter and below it, a supporting member being provided near the delivery end of said conveyor, which supporting member is movable in the horizontal direction between a position in which the opening to said accommodation is substantially clear and a position in which said opening is shut off, while displacement means are present for moving said supporting member, which displacement means are designed in such a way that during displacement to the position which shuts off the opening of the accommodation the speed of the supporting member corresponds approximately to the speed of said conveyor.

According to a further aspect of the invention, the displacement means are embodied in such a way that the supporting member is moved at a speed of at least 1 m/s, and preferably 3 m/s, to the position which clears the opening of the accommodation.

The supporting member can comprise a supporting plate on which the packagings, such as bags of frozen chips, but also any other pack known in the prior art, can be moved.

According to a further advantageous embodiment of the invention, the displacement means comprise a servomotor. According to a further advantageous embodiment, the conveyor comprises a levelling section for placing the packagings preferably in as flat a position as possible on a conveyor and subsequently stacking them on top of one another in the vertical direction.

The invention also relates to a method for delivery of a pack from a conveyor which extends substantially horizontally to an accommodation situated below it near the end of the conveyor, in which on the arrival of said pack at the end of said conveyor a supporting plate provided near said end of said conveyor is moved past said end of said conveyor in substantially the same direction of displacement and at substantially the same speed of displacement as said conveyor, in which process said pack is moved with said supporting member, and said supporting member is moved back to the end of the conveyor after said pack is resting substantially on it.

More particularly, according to a further aspect of the invention, the bearing surface of said supporting member and the return displacement of said supporting member are embodied in such a way that said pack undergoes substantially no return displacement.

According to a special embodiment of the invention, at the end of the return displacement the pack has substantially no horizontal speed.

BRIEF DESCRIPTION OF THE DRAWINGS

An exemplary embodiment of the invention, which must in no way be interpreted as limiting, is shown in the drawing, in which:

FIG. 1 shows diagrammatically a conveyor assembly according to the present invention;

FIG. 2 shows diagrammatically in side view the end part of the conveyor assembly according to the invention, in a first position;

FIG. 3 shows the view according to FIG. 2, in a second position;

DETAILED DESCRIPTION OF THE PREFERRED EMBODIMENT

Figure 4:
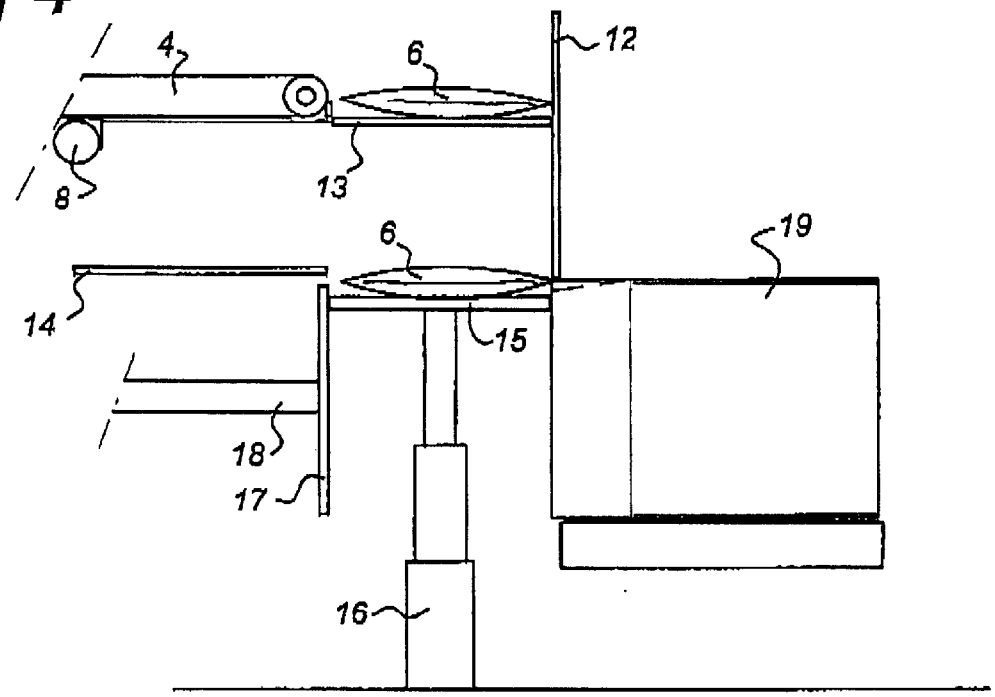
FIG. 4 shows the view according to FIG. 2, in a third position.

FIG. 1 shows a conveyor belt 2, by means of which articles 6 can be fed to a outer 19. The end of conveyor belt 2 rotates about a roller or shaft 4. If articles of differing length have to be packed, said roller or shaft 4 can be of a design that is movable in the longitudinal direction.

Upstream of the conveyor 2 is a levelling section, shown only diagrammatically. The levelling section can be a vibrating plate or a construction with square rollers.

A bearing plate 13, connected to a servomotor 8, is provided at the end of the conveyor belt 2, at a short distance below it. The bearing plate 13 extends to a stop 12. A buffer plate 14 is situated below the bearing plate 13.

The buffer plate 14 is driven by a reciprocating system with belt. The speed of displacement of this system is considerably lower than that of the servomotor-driven bearing plate 13.

FIGS. 2–6 show in side view the receiving/discharge device. This device comprises the bearing plate 13 described above, which is movable to and fro in the direction of arrow 21 by means of servomotor 8. Below it is a buffer plate 14, which is movable in the direction of arrow 22. Below that is a lifting plate 15, which is adjustable in height by means of a diagrammatically illustrated control 16. In addition, a pusher plate 17 is present, which pusher plate can be moved by means of control 18. FIGS. 1 and 2 show boxes 19 being supplied in such a way that the opening 20 of said boxes is substantially vertical.

Figure 5:
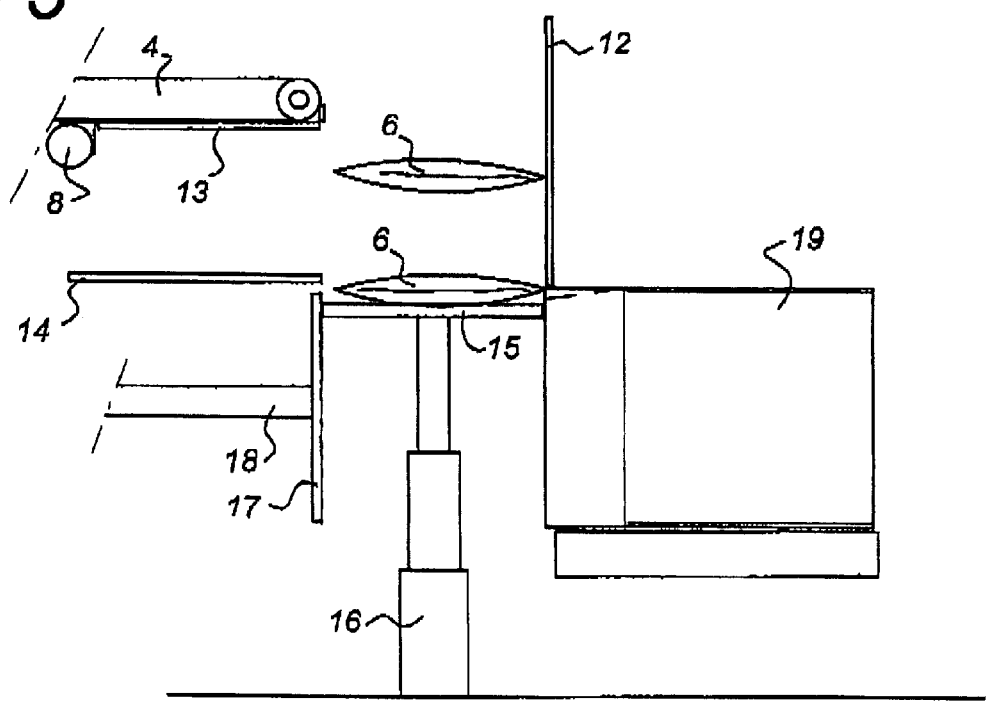
FIG. 5 shows the view according to FIG. 2, in a fourth position.

Starting from a situation where a series of articles 6 is positioned on distributing conveyor 2, on reaching the delivery end of said conveyor (near shaft 4), the article 6 at the front will move the product downwards over the height of the conveyor at the delivery end. Simultaneously with this downward displacement, bearing plate 13 is operated by servomotor 8 in such a way that said plate moves at substantially the same speed as the conveyor near the delivery end, for example 0.8 m/s. This means that the displacement of the articles 6 is continued, and the article 6 is gradually taken over by bearing plate 13. The transfer of the article 6 to bearing plate 13 is shown diagrammatically in FIG. 3. When the article is lying fully on bearing plate 13, the latter is moved back very quickly by means of servomotor 8. Owing to the smoothness of the surface of bearing plate 13 and the speed of displacement of said bearing plate, together with the inertia of the pack (its weight can be several kg), the pack 6 does not move back with the plate and remains substantially in the same horizontal position. It goes without saying that the pack 6 will fall a position downwards onto buffer plate 14, as shown in FIGS. 5 and 2. Owing to the short height of fall of the pack from the conveyor onto the bearing plate and from the bearing plate onto the buffer plate, damage to pack and product, such as snacks and more particularly crisps, is avoided. This return displacement preferably occurs at a speed higher than 1 m/s, and more particularly higher than 2.5 m/s. It will be understood that the displacement to the right of the bearing plate can be initiated in any way known in the prior art. For instance, it is possible to detect the different positions of the pack by means of a photoelectric cell, and thus to control the displacement of the bearing plate both at the time of receiving of the pack and at the time of clearing of the opening 7.

Figure 6:
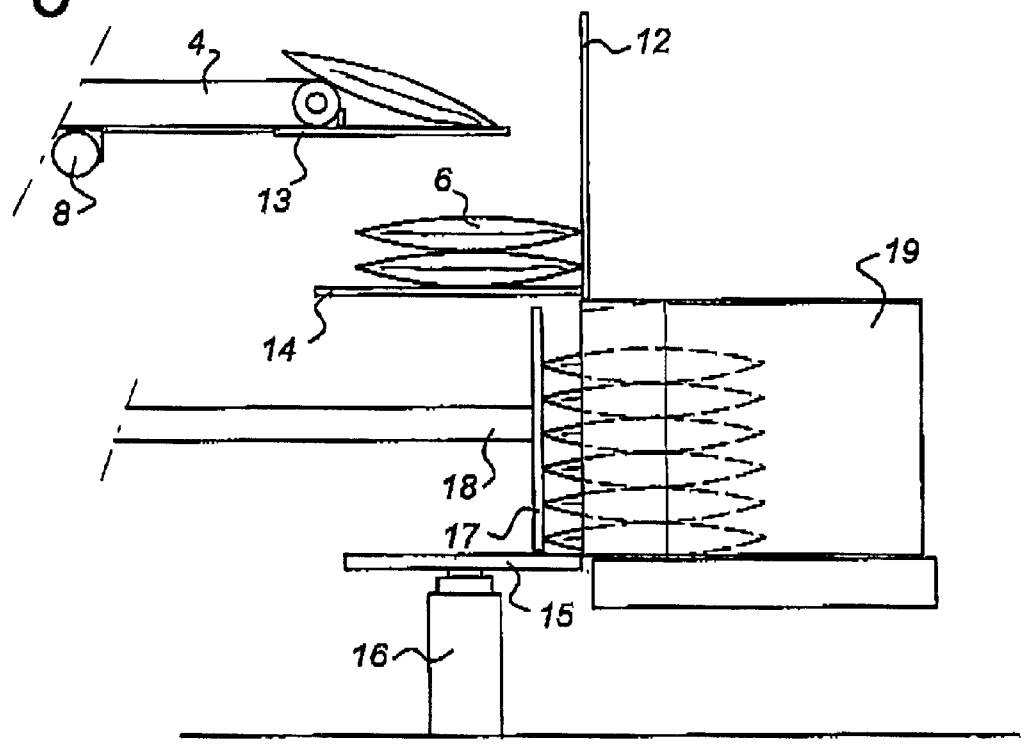
FIG. 6 shows the view according to FIG. 2, in a fifth position.

Such an operation subsequently occurs again until two articles are lying on the buffer plate 14. After that, or even before, the lifting plate 16 is moved upwards and on the displacement of buffer plate 14 in the direction of arrow 22 the two series of articles are taken over. This process is repeated until a series of rows of products corresponding to the desired number of products to be placed in the box 19 is situated on the lifting plate 16. This is shown in FIG. 6. Some compression of the series of products is subsequently carried out by means of control 16. This is, of course, dependent upon the product concerned. The lifting device 16 is then moved back slightly, so that pusher plate 17 can slide to the right in the figure with the aid of control 18, and the series of rows of products can slide into box 19. In the meantime, buffer plate 14 is being filled in the manner described above. In this way it is possible to fill boxes with products continuously. These products will be placed upright in the boxes. It is also possible to place two tiers of products, one on top of the other, upright in box 19.

The invention is particularly suitable for stacking heavier bags such as bags filled with one or more kg of chips. According to an advantageous embodiment of the invention, the course of displacement of both the displacement to the right and the return displacement of the bearing plate and also the moment at which the latter moves back are accurately adjustable. In this way it can be ensured that the bag is not swept off during the return displacement. It can also be ensured that the pack does not start to move and run against a horizontal stop, possibly being damaged in the process.

It will be understood that, instead of the single row of packagings described above, two or more parallel rows, or rows staggered relative to each other, can be used. In addition, guides may be present, in order to move the packagings in the desired direction.

It will be understood that only examples are given above, and that the invention is by no means limited to these. Variants will immediately occur to the person skilled in the art on reading the above description, and lie with the scope of the appended claims.

What is claimed is:

1. Conveyor assembly for packagings (6), comprising a substantially horizontally conveying conveyor (2) and an accommodation for packagings, which receptacle is situated near the delivery end of said conveyor, in line with the latter and below it, a supporting member (13) being provided near the delivery end of said conveyor, which supporting member is movable in the horizontal direction between a position in which the opening (7) to said accommodation is substantially clear and a position in which said opening is shut off, while displacement means (8) are present for moving said supporting member, which displacement means are embodied in such a way that during displacement to the position which shuts off the opening (7) of the receptacle the speed of the supporting member corresponds approximately to the speed of said conveyor.

2. Conveyor assembly according to claim 1, in which said displacement means (8) are designed in such a way that the supporting member is moved at a speed of at least 1 m/s to the position which clears the opening of the receptacle.

3. Conveyor assembly according to claim 1, in which said supporting member comprises a supporting plate.

4. Conveyor assembly according to claim 1, in which said displacement means comprise a servomotor.

5. Conveyor assembly according to claim 1, in which said conveyor comprises a levelling section.

6. Method for delivery of a pack from a conveyor which extends substantially horizontally to a receptacle situated below it near the end of the conveyor, in which on the arrival of said pack at the end of said conveyor a supporting plate provided near said end of said conveyor is moved past said end of said conveyor in substantially the same direction of displacement and at substantially the same speed of displacement as said conveyor, in which process said pack is moved with said supporting member and said supporting member is moved back to the end of the conveyor after said pack is resting substantially on it.

7. Method according to claim 6, in which the bearing surface of said supporting member and the return displacement of said supporting member are designed in such a way that said pack undergoes substantially no return displacement.

8. Method according to claim 7, in which at the end of the return displacement said pack has substantially no horizontal speed.

* * * * *